Patented Feb. 23, 1954

2,670,316

UNITED STATES PATENT OFFICE 2,670,316

PROCESS FOR THE PRODUCTION OF FIBROUS WEBS

John Allan and Edward Boaden Thomas, Spondon, near Derby, England, assignors to British Celanese Limited, a corporation of Great Britain No Drawing. Application July 18, 1950, Serial No. 174,586

Claims priority, application Great Britain July 22, 1949

2 Claims. (Cl. 154—136)

This invention relates to laminated materials, and especially to the production of laminates from fibrous material impregnated with a thermosetting synthetic resin.

It is well known to form laminates by bonding together fibrous reinforcing material, for example, textile fabrics or paper, impregnated with a thermosetting resin, under such conditions of heat and pressure that the synthetic resin is cured and a hard, tough, compact material is produced. Two qualities particularly sought after in such material are high impact-strength and low water-absorption. These properties however, are not readily obtained in combination.

We have found that an excellent reinforcing fibrous material for the manufacture of laminates of the kind referred to can be woven from high-tenacity, high-viscosity continuous-filament regenerated cellulose yarn such as can be obtained by saponification of a high viscosity cellulose acetate yarn which has been stretched in wet steam to a tenacity of at least 6 gms. per denier. By a high viscosity cellulose acetate is meant one which is 6% solution in commercial acetone at 25° C. has a viscosity of at least 500 cps. By impregnating such a fabric with a phenol/aldehyde thermosetting synthetic resin in which the condensation has not proceeded beyond water-solubility, and forming laminates from the impregnated material in the usual way, we have obtained products of very high impact-strength. By employing instead of the water-soluble phenol/aldehyde synthetic resin one in which condensation has been carried beyond water-solubility, but not beyond alcohol-solubility, we have obtained a product of considerably lower water-absorption, coupled, also, however with lower impact-strength. We have now found that by first impregnating the reinforcing fabric with the water-soluble synthetic resin and then, after drying, with the alcohol-soluble resin, for the same resin content, a product is obtained having an unexpectedly good combination of high impact-strength with low water-absorption. We have further found that impregnation first with a water-soluble thermosetting synthetic resin and then with a water-insoluble, alcohol-soluble synthetic resin is of advantage in the preparation of laminates of high impact-strength and low water-absorption from fibrous webs other than fabrics of high-tenacity regenerated cellulose. The present invention includes impregnating fibrous webs with the two kinds of synthetic resin in the order described, as well as the impregnated webs so produced, the making of laminates from such impregnated webs, and the laminates so made.

Examples 3 to 5 below illustrate the invention. The advantage obtained by impregnation first with the water-soluble synthetic resin and then with the alcohol-soluble synthetic resin, over impregnation with either resin alone will be appreciated by comparing the results of Example 3 with those of Example 1 in which a water-soluble resin alone is used and Example 2 in which only a water-insoluble, alcohol-soluble resin is used.

EXAMPLE 1

The reinforcing fabric used was woven from a regenerated cellulose made by dry-spinning a yarn having a viscosity of 500–600 cps. determined as specified above, stretching this yarn to a tenacity of 6 to 7 gms./denier in moist steam, and completely saponifying the stretched yarn in caustic soda containing sodium acetate. The yarn was of 60 denier and had a twist of 5 turns per inch. It was plain woven with 96 ends/inch and 94 picks/inch to give a fabric of weight 1.54 oz./yd. and porosity 19.3 (the porosity was determined as the air flow in cu. ft./sec./sq. ft. of fabric under a pressure drop of 10 inches of water on a Micklewright high pressure porosity machine). The cover of the fabric (i. e. the ratio of total number of threads per inch to cotton yarn count) was 20.2. The crimp, determined by the method described in "Textile Testing" by J. H. Skinkle, the Chemical Publishing Co., New York, 1940, was 0.40% in the warp and 0.95% in the weft.

The fabric was padded with an aqueous solution of a water-soluble condensation product of common phenol with a molecular excess of formaldehyde and dried to give a product containing 50% of the synthetic resin. The impregnated fabric was cut into sheets, then heated for 3 hrs. at 65 to 70° C., stacked, and pressed under a pressure of 0.5 ton/sq. inch for one hour at 160° C. to give a laminate of approximately 0.5 inch in thickness. In the table below the laminate obtained in this way is referred to as "A."

EXAMPLE 2

In the same way as in Example 1 a laminate was made from another sample of the fabric used in that example, in which however, the synthetic resin used was an alcohol-soluble condensation product of m-cresol with a molar excess of formaldehyde, applied in solution in industrial alcohol. The laminate obtained is referred to in the table below as "B."

EXAMPLE 3

A third sample of the fabric used in Example 1 was impregnated first with the water-soluble synthetic resin, and then, after drying, with the alcohol-soluble. The impregnated fabric contained 23.5 parts of the water-soluble synthetic resin and 28.0 parts of the alcohol-soluble synthetic resin. A laminate was made from this impregnated fabric in the same way as before and is referred to below as "C."

Some of the properties of the three laminates obtained as described above, are given in the following table:

Table

| Property | A | B | C |
| --- | --- | --- | --- |
| Tensile strength _____ lb./sq. in__ | 21,500 | 21,900 | 21,250 |
| Compression strength: | | | |
| flatwise _____ lb./sq. in__ | 43,200 | 42,050 | 44,000 |
| edgewise _____ lb./sq. in__ | 25,500 | 24,400 | 27,080 |
| Impact strength (Izod:un-notched): | | | |
| flatwise _____ ft. lbs__ | 2.5 | 11.2 | 10.0 |
| edgewise _____ ft. lbs__ | 2.0 | 5.2 | 4.0 |
| Water absorption _____ mgm__ | 31 | 168 | 54 |
| Hardness—Rockwell-M scale _____ | M. 119 | M. 112 | M. 120 |

The Izod method of determining impact strength is described in "Handbook of Plastics," H. R. Simonds and Carleton Ellis, 1943, pages 66–68. The test pieces used were as specified therein but un-notched.

It will be observed that for the product C the impact strength flatwise (10.0 ft. lbs.) is considerably greater than either the arithmetical mean (6.75 ft. lbs.) or the geometrical means (5.25 ft. lbs.) of A and B. Similarly the impact strength measured edgewise (4.0 ft. lbs.) is considerably greater than either the arithmetic means (3.6 ft. lbs.) or the geometric mean (3.22 ft. lbs.) of A and B.

The water absorption (54 mgms.), on the other hand, is considerably lower than either the arithmetic mean (100 mgms.) of the geometric mean (72 mgms.) for A and B. Also in hardness and compressive strength C has the advantage over both A and B, while in tenacity there is little difference between the three materials.

EXAMPLE 4

The process was carried out as in Example 3 using a fabric of the same structure as in that example but composed of regenerated cellulose continuous filament yarn of tenacity 6 gms./denier and extension 6% made by complete saponification of a yarn of cellulose acetate of viscosity 60 cps. that had been stretched in moist steam.

EXAMPLE 5

The process was carried out as in Example 3 but using a plain woven cotton fabric of weight 4.5 oz./sq. yd. containing 90 ends/inch and 90 picks/inch each of count 32s.

Other water-soluble and water-insoluble, alcohol-soluble phenol/aldehyde synthetic resins can be employed in the same way as those of Example 3. Thus, for example, either or both of the synthetic resins used can be formed from one of a number of different phenols for example, common phenol, resorcinol, m-cresol, or phloroglucinol, with formaldehyde or other suitable aldehyde especially furfural. With aldehydes that, like acetaldehyde, do not form thermosetting synthetic resins with a phenol in the absence of a cross-linking agent, some formaldehyde or its equivalent must be present. The aldehyde should always be present in molar excess and preferably in a molar proportion relative to the phenol of about 3:2. The phenol of course should have at least 3 reactive positions, i. e. at least 3 unsubstituted hydrogen atoms in the ortho or para positions to a phenol group. The preliminary condensation producing the water-soluble or alcohol-soluble synthetic resin should be carried out in the presence of an alkaline catalyst.

The process of the invention is of particular importance in making laminates from fibrous webs in which the fibre is of cellulose, this term being used to include regenerated cellulose as well as native cellulose, e. g. in the form of cotton, linen, sisal and ramie. The best results have been obtained with fabrics of continuous-filament, high-tenacity material made by saponification of high-tenacity, high viscosity cellulose acetate yarn. Very valuable results have also been obtained when the cellulose acetate from which the yarn was made was of considerably lower viscosity, i. e. of viscosity between 50 and 500 cps., e. g. 60 to 100 cps., measured as specified above. The stretching to impart the necessary high tenacity to the cellulose acetate yarn, although preferably carried out in wet steam, can also be performed in hot water or even in an organic stretch-assisting agent; or the regenerated cellulose yarn may be obtained by saponification of a cellulose acetate yarn of high tenacity made by wet-spinning with high stretch. Saponification should be carried out under conditions favouring retention or even increase in tenacity. High tenacity regenerated cellulose yarns made by wet-spinning solutions of cellulose with high stretch, for example, cuprammonium cellulose or viscose, can also be used but with less advantage. The fibrous material should preferably be woven from a continuous-filament yarn of tenacity at least 3 gms./denier, and to obtain the best results the yarn should have a tenacity of at least 6 gms./denier and a low extension, e. g. not greater than 7%. Non-cellulosic high-tenacity fibrous materials that can be used, preferably in the form of continuous-filament yarns in making suitable fabrics, are glass and polyacrylonitrile. Mixed fabrics may be used, for example, glass-fibre/cotton fabrics and fabrics containing vegetable fibre or glass fibre in admixture with high tenacity regenerated cellulose fibre. The fabrics should preferably contain at least 80% of a high-tenacity continuous-filament yarn.

Satisfactory results have been obtained with plain-woven fabrics of denier as high as 1,100 and of porosity as high as 80 with no more than 14 ends per inch and the same number of picks per inch. In general, however, the best results have been obtained when the porosity of the fabric lies between 10 and 20, and with a relatively large number of ends and picks of low denier, for example, with at least 60 ends per inch and about the same number of picks per inch and a denier not more than about 100. The twist should be low, preferably no more than 5 turns per inch, for example 2½ turns per inch, and the crimp in both warp and weft should preferably be below 2%, for example, 0.25 to 1% or even less than 0.25. It will be realised that with some staple fibre-fabrics that can be used (though with less advantage than continuous-filament fabrics) the twist and crimp cannot be kept to the low order preferred. This is true for instance of some fine cotton fabrics where the yarn is of very low count.

Although, as indicated above, the invention is of primary importance in making laminates from impregnated woven fabrics, it also covers the use of fibrous webs of unwoven material. Thus, for example paper of the quality used in making laminates of high impact-strength may be used instead of a woven fabric.

The best results have been obtained, as indicated above, with phenol/aldehyde resins. Useful results, however, are also obtained by the use of other water-soluble and alcohol-soluble thermosetting synthetic resins, provided that the water-soluble resin be first applied. The resins may, for example, be of the amino-aldehyde type, for example, urea/formaldehyde or melamine/formaldehyde. The fibrous web may for example be impregnated first with a water-soluble urea/formaldehyde or melamine/formaldehyde thermosetting synthetic resin and then with a water-insoluble, alcohol-soluble phenol/formaldehyde thermosetting synthetic resin.

Having described our invention, what we desire to secure by Letters Patent is:

1. Process for the production of fibrous webs from which laminates of high impact strength and low water absorption can be made by bonding layers of the web together under heat and pressure, which comprises impregnating a fibrous web of material selected from the class consisting of cellulose and regenerated celluloses of fibre-tenacity at least 3 grams per denier, first with a water-soluble, thermosetting synthetic resin, and then with a water-insoluble, alcohol-soluble, thermosetting synthetic resin, both synthetic resins being condensation products of a phenol having at least 3 reactive positions with a molar excess of formaldehyde.

2. Process for the production of fibrous webs from which laminates of high impact strength and low water absorption can be made by bonding layers of the web together under heat and pressure, which comprises impregnating a woven fabric of which at least 80% by weight of the yarns are composed of continuous filaments of regenerated cellulose of tenacity at least 6 grams per denier and extension not greater than 7%, with a water-soluble, thermosetting synthetic resin and then with a water-insoluble, alcohol-soluble, thermosetting synthetic resin, both synthetic resins being condensation products of a phenol having at least 3 reactive positions with a molar excess of formaldehyde.

JOHN ALLAN.
EDWARD BOADEN THOMAS.

References Cited in the file of this patent

UNITED STATES PATENTS

| Number | Name | Date |
|---|---|---|
| 2,113,434 | Schuhmann | Apr. 5, 1938 |
| 2,150,698 | Nevin | Mar. 14, 1939 |
| 2,211,951 | Hershberger | Aug. 20, 1940 |
| 2,354,426 | Briant | July 25, 1944 |
| 2,423,428 | Pollard | July 1, 1947 |
| 2,425,805 | Hyman | Aug. 19, 1947 |
| 2,497,454 | Illingworth et al. | Feb. 14, 1950 |
| 2,542,484 | Debing et al. | Feb. 20, 1951 |